(12) United States Patent
Hicks et al.

(10) Patent No.: US 10,253,460 B2
(45) Date of Patent: Apr. 9, 2019

(54) COMPOSITE PAVEMENT STRUCTURE

(71) Applicants: BASF SE, Ludwigshafen (DE);
Pervious Paving Contractors LLC, Higbee, MO (US)

(72) Inventors: Steven Hicks, Brownstown, MI (US);
David K. Bower, Canton, MI (US);
William Handlos, Manitowoc, WI (US)

(73) Assignees: BASF SE, Ludwigshafen (DE);
Pervious Paving Contractors LLC, Higbee, MO (US)

( * ) Notice: Subject to any disclaimer, the term of this patent is extended or adjusted under 35 U.S.C. 154(b) by 0 days.

(21) Appl. No.: 15/344,673

(22) Filed: Nov. 7, 2016

(65) Prior Publication Data

US 2017/0152180 A1 Jun. 1, 2017

Related U.S. Application Data

(63) Continuation of application No. 13/517,935, filed as application No. PCT/US2010/058582 on Dec. 1, 2010, now Pat. No. 9,505,931.

(Continued)

(51) Int. Cl.
| | | |
|---|---|---|
| E01C 7/18 | (2006.01) | |
| C03C 12/00 | (2006.01) | |
| C03C 17/30 | (2006.01) | |
| C03C 17/34 | (2006.01) | |
| C04B 20/10 | (2006.01) | |
| C04B 26/16 | (2006.01) | |
| C08G 18/10 | (2006.01) | |
| C08G 18/32 | (2006.01) | |
| C08G 18/42 | (2006.01) | |
| C08G 18/76 | (2006.01) | |
| C08K 3/40 | (2006.01) | |
| C08L 21/00 | (2006.01) | |
| C08L 75/04 | (2006.01) | |
| E01C 7/30 | (2006.01) | |
| E01C 11/00 | (2006.01) | |
| C08K 3/34 | (2006.01) | |

(Continued)

(52) U.S. Cl.
CPC ............ *E01C 7/182* (2013.01); *C03C 12/00* (2013.01); *C03C 17/30* (2013.01); *C03C 17/3405* (2013.01); *C04B 20/1051* (2013.01); *C04B 26/16* (2013.01); *C08G 18/10* (2013.01); *C08G 18/3206* (2013.01); *C08G 18/4244* (2013.01); *C08G 18/7664* (2013.01); *C08K 3/34* (2013.01); *C08K 3/40* (2013.01); *C08L 21/00* (2013.01); *C08L 75/04* (2013.01); *E01C 7/30* (2013.01); *E01C 11/005* (2013.01); *C04B 2111/0075* (2013.01); *C04B 2111/00284* (2013.01); *C04B 2111/00293* (2013.01); *C04B 2111/00612* (2013.01); *C04B 2111/60* (2013.01); *C04B 2201/50* (2013.01); *Y10T 428/249984* (2015.04); *Y10T 428/25* (2015.01); *Y10T 428/31551* (2015.04)

(58) Field of Classification Search
CPC ................ C04B 26/16; C04B 20/1051; C04B 2111/00284; C04B 2111/0075; C04B 2201/50; C04B 2111/00293; C04B 2111/00612; C04B 2111/60; C03C 12/00; C03C 17/30; C03C 17/3405; E01C 7/30; E01C 7/182; E01C 11/005; C08K 3/34; C08K 3/40; C08L 21/00; C08L 75/04; Y10T 428/249984; Y10T 428/25; Y10T 428/31551
USPC ......................................................... 524/494
See application file for complete search history.

(56) References Cited

U.S. PATENT DOCUMENTS

| | | |
|---|---|---|
| 3,240,736 A | 3/1966 | Beckwith |
| 3,272,098 A | 9/1966 | Buchholtz et al. |

(Continued)

FOREIGN PATENT DOCUMENTS

| | | |
|---|---|---|
| CA | 2 037 214 A1 | 9/1991 |
| CN | 1609340 A | 4/2005 |

(Continued)

OTHER PUBLICATIONS

Anna Wypych, Databook of Adhesion Promoters, ChemTec Publishing—Toronto, 2018, p. 329. (Year: 2018).*

(Continued)

*Primary Examiner* — Ling Siu Choi
*Assistant Examiner* — Ronald Grinsted
(74) *Attorney, Agent, or Firm* — Burris Law, PLLC (57) ABSTRACT

A process for making a composite pavement structure comprising primed glass aggregate particles and a polymeric binder composition is disclosed. Systems and methods are also disclosed for the priming of glass aggregate particles. In one embodiment, the glass aggregate particles range from about 0.1 to about 0.5 inch in diameter and are exposed to a coupling agent in solution, for example an aqueous aminosilane solution, in an amount of about 1 to about 10 parts by weight of solution based on 100 parts by weight of the glass aggregate particles wherein the aqueous solution contains about 0.01 to about 5.0 parts by weight coupling agent based on 100 parts by weight of solution. After exposure, the primer is allowed to react and bond with the glass aggregate particles for a predetermined time period to provide primed glass particles, for example silylated glass particles, which are then dried. Once the primed glass and polymeric binder composition are mixed, they are allowed react and bond to provide a composite pavement structure.

11 Claims, 4 Drawing Sheets

Related U.S. Application Data (60) Provisional application No. 61/288,637, filed on Dec. 21, 2009.

(51) Int. Cl.
*C04B 111/00* (2006.01)
*C04B 111/60* (2006.01)

(56) References Cited

U.S. PATENT DOCUMENTS

| | | |
|---|---|---|
| 3,396,644 A | 8/1968 | Banks |
| 3,577,893 A | 5/1971 | Towner |
| 3,690,021 A | 9/1972 | Glass et al. |
| 3,690,227 A | 9/1972 | Welty |
| 3,711,444 A | 1/1973 | Allen et al. |
| 3,850,537 A | 11/1974 | Bynum, Jr. |
| 3,909,474 A | 9/1975 | Borchert et al. |
| 3,911,667 A | 10/1975 | Komiyama |
| 3,958,891 A | 5/1976 | Eigenmann |
| 4,021,401 A | 5/1977 | Jeppsen |
| 4,063,839 A | 12/1977 | Brown |
| 4,076,917 A | 2/1978 | Swift et al. |
| 4,088,633 A | 5/1978 | Gurney |
| 4,097,423 A | 6/1978 | Dieterich |
| 4,112,176 A | 9/1978 | Bailey |
| 4,114,382 A | 9/1978 | Kubens et al. |
| 4,139,676 A | 2/1979 | Janssen et al. |
| 4,157,907 A | 6/1979 | Kroyer |
| 4,247,933 A | 1/1981 | Nakamura |
| 4,433,701 A | 2/1984 | Cox et al. |
| 4,441,821 A | 4/1984 | Burkhart et al. |
| 4,452,551 A | 6/1984 | Amdt et al. |
| 4,550,153 A | 10/1985 | Carver |
| 4,559,239 A | 12/1985 | Cenegy |
| 4,630,963 A | 12/1986 | Wyman |
| 4,659,748 A | 4/1987 | Boddie |
| 4,721,493 A | 1/1988 | Lane |
| 4,761,099 A | 8/1988 | Mann et al. |
| 4,792,262 A | 12/1988 | Kapps et al. |
| 4,797,026 A | 1/1989 | Webster |
| 4,915,539 A | 4/1990 | Yoshikane et al. |
| 4,922,463 A | 5/1990 | Del Zotto et al. |
| 5,001,190 A | 3/1991 | Carpenter et al. |
| 5,043,955 A | 8/1991 | Dubois et al. |
| 5,044,819 A | 9/1991 | Kilheffer et al. |
| 5,106,227 A | 4/1992 | Ahmad et al. |
| 5,123,778 A | 6/1992 | Bohnhoff |
| 5,149,192 A | 9/1992 | Hamm et al. |
| 5,182,137 A | 1/1993 | Allen |
| 5,225,210 A | 7/1993 | Shimoda |
| 5,250,340 A | 10/1993 | Bohnhoff |
| 5,298,539 A | 3/1994 | Singh et al. |
| 5,364,672 A | 11/1994 | Schultze-Kraft |
| 5,432,213 A | 7/1995 | Kim et al. |
| 5,447,388 A | 9/1995 | Rouse |
| 5,480,256 A | 1/1996 | Itsekson et al. |
| 5,494,741 A | 2/1996 | Fekete et al. |
| 5,590,976 A | 1/1997 | Kilheffer et al. |
| 5,648,421 A | 7/1997 | Thiele et al. |
| 5,693,413 A | 12/1997 | Hesterman et al. |
| 5,788,407 A | 8/1998 | Hwang |
| 5,836,715 A | 11/1998 | Hendrix et al. |
| 5,848,856 A | 12/1998 | Bohnhoff |
| 5,891,938 A | 4/1999 | Williams |
| 5,936,015 A | 8/1999 | Bums |
| 5,956,294 A | 9/1999 | Takizawa et al. |
| 6,007,233 A | 12/1999 | Cairns |
| 6,206,607 B1 | 3/2001 | Medico, Jr. et al. |
| 6,225,371 B1 | 5/2001 | Prerre |
| 6,235,367 B1 | 5/2001 | Holmes et al. |
| 6,370,087 B1 | 4/2002 | Akahane et al. |
| 6,372,135 B1 | 4/2002 | Kohlstadt et al. |
| 6,495,652 B1 | 12/2002 | Reichelt et al. |
| 6,702,514 B2 | 3/2004 | Kaneko et al. |
| 6,826,122 B2 | 11/2004 | Zaugg |
| 6,887,922 B1 | 5/2005 | Roddis |
| 6,962,463 B2 | 11/2005 | Chen |
| 7,041,221 B2 | 5/2006 | Amott |
| 7,168,884 B2 | 1/2007 | Hart |
| 7,172,145 B2 | 2/2007 | Knepp |
| 7,342,056 B2 | 3/2008 | Patel et al. |
| 7,496,003 B2 | 2/2009 | Muller |
| 7,782,717 B2 | 8/2010 | Gil et al. |
| 7,879,921 B2 | 2/2011 | Cummins |
| 8,025,456 B2 | 9/2011 | Kaul |
| 8,710,135 B2 | 4/2014 | Bower et al. |
| 9,464,003 B2 | 10/2016 | Hicks et al. |
| 9,505,931 B2 | 11/2016 | Hicks et al. |
| 2002/0016421 A1 | 2/2002 | Goeb et al. |
| 2002/0022086 A1 | 2/2002 | Hughes et al. |
| 2003/0090016 A1 | 5/2003 | Petrovic et al. |
| 2004/0074421 A1 | 4/2004 | Anderson |
| 2004/0091712 A1* | 5/2004 | Marohn ............... C04B 14/22 428/417 |
| 2004/0109730 A1 | 6/2004 | Moss et al. |
| 2006/0293428 A1 | 12/2006 | Singh et al. |
| 2007/0091727 A1 | 4/2007 | Bonvin et al. |
| 2007/0093602 A1 | 4/2007 | Thompson-Colon et al. |
| 2007/0172590 A1 | 7/2007 | Hoffmann et al. |
| 2007/0189109 A1 | 8/2007 | Long |
| 2007/0213456 A1 | 9/2007 | Singh et al. |
| 2008/0058461 A1 | 3/2008 | Cummins |
| 2008/0118637 A1 | 5/2008 | Serwin |
| 2008/0144444 A1 | 6/2008 | Mahler et al. |
| 2008/0151698 A1 | 6/2008 | Gil et al. |
| 2008/0253235 A1 | 10/2008 | Hiraga et al. |
| 2009/0062432 A1 | 3/2009 | Doesburg et al. |
| 2009/0067924 A1 | 3/2009 | Kaul |
| 2009/0067925 A1 | 3/2009 | Kaul |
| 2010/0212552 A1 | 8/2010 | Stratton et al. |
| 2012/0329943 A1 | 12/2012 | Hicks et al. |
| 2014/0106124 A1 | 4/2014 | Hicks et al. |

FOREIGN PATENT DOCUMENTS

| | | | |
|---|---|---|---|
| CN | 1968982 A | 5/2007 | |
| CN | 1994955 A | 7/2007 | |
| CN | 101357828 A | 2/2009 | |
| DE | 651 167 C | 10/1937 | |
| DE | 2713984 | 10/1978 | |
| DE | 200 00 015 U1 | 5/2000 | |
| DE | 102 31 858 A1 | 1/2004 | |
| EP | 0 445 578 A2 | 9/1991 | |
| EP | 0 583 086 A1 | 2/1994 | |
| EP | 0 911 304 A1 | 4/1999 | |
| EP | 1 176 257 A2 | 1/2002 | |
| EP | 1 462 571 A2 | 9/2004 | |
| FR | 2 188 596 A5 | 1/1974 | |
| FR | 2 653 360 A1 | 4/1991 | |
| FR | 2 791 692 A1 | 10/2000 | |
| GB | 1 604 405 | 12/1981 | |
| GB | 1604405 A * | 12/1981 | ............ C04B 26/10 |
| JP | S 63-319223 A | 12/1988 | |
| JP | H 04-001309 A | 1/1992 | |
| JP | H 10-102444 A | 4/1998 | |
| JP | H 11-80304 A | 3/1999 | |
| JP | 2002-021011 A | 1/2002 | |
| JP | 2003-267953 A | 9/2003 | |
| JP | 2004-076527 A | 3/2004 | |
| JP | 2007-132020 A | 5/2007 | |
| JP | 2007-285045 A | 11/2007 | |
| JP | 2007-289869 A | 11/2007 | |
| JP | 2008-502773 A | 1/2008 | |
| JP | 2009-293326 A | 12/2009 | |
| KR | 96-0011358 B1 | 8/1996 | |
| KR | 10-2007-0020328 A | 2/2007 | |
| KR | 10-1395451 B1 | 5/2014 | |
| KR | 10-1669716 B1 | 10/2016 | |
| WO | WO 95/00569 A1 | 1/1995 | |
| WO | WO 98/29356 A2 | 7/1998 | |
| WO | WO 02/076900 A2 | 10/2002 | |
| WO | WO 03/062532 A1 | 7/2003 | |
| WO | WO 2004/014815 A1 | 2/2004 | |
| WO | WO 2009/033037 A2 | 3/2009 | |

(56) References Cited

FOREIGN PATENT DOCUMENTS

| WO | WO 2010/149737 A2 | 12/2010 |
|---|---|---|
| WO | WO 2011/084274 A1 | 7/2011 |
| WO | WO 2011/084793 A1 | 7/2011 |
| WO | WO 2011/084802 A1 | 7/2011 |
| WO | WO 2011/084807 A1 | 7/2011 |
| WO | WO 2012/091707 A1 | 7/2012 |
| WO | 2008/110222 | 9/2018 |

OTHER PUBLICATIONS

International Search Report for Application No. PCT/US2010/061587 dated Mar. 1, 2011, 2 pages.
International Search Report for Application No. PCT/US2010/061558 dated Mar. 3, 2011, 3 pages.
International Search Report for Application No. PCT/US2010/061574 dated Mar. 4, 2011, 2 pages.
International Search Report for Application No. PCT/US2010/058582 dated Apr. 27, 2011, 4 pages.
International Search Report for Application No. PCT/EP2010/08989 dated Aug. 19, 2011, 4 pages.
Crouch, L.K. et al. "Measuring the Effective Air Void Content of Portland Cement Pervious Pavements," ASTM Journal of Cement, Concrete, and Aggregates, 25(1), 2003, 5 pages.
Montes, Felipe et al., "A New Test Method for Porosity Measurements of Portland Cement Pervious Concrete," J. ASTM Int. 2(1), 2005, 13 pages.
Montes, Felipe et al., "Measuring Hydraulic Conductivity in Pervious Concrete," Env. Eng. Sci. 23(6), 2006, 10 pages.
Schaefer, V. et al., "Mix Design Development for Pervious Concrete in Cold Weather Climates," Final Report, Civil Engineering, Iowa State University, 2006, 85 pages.
Yamaguchi, H. et al. "Manufacture of Colored Artificial Stones with High Strength", Database Chemical Abstracts, Chemi [Online], Oct. 7, 1991, 2 pages.
English language abstract for CN 1609340 extracted from espacenet.com database dated Dec. 29, 2014, 2 pages.
English language abstract for CN 1968982 extracted from espacenet.com database dated Dec. 2, 2015, 1 page.
English language abstract and machine-assisted English translation for CN 1994955 extracted from espacenet.com database dated Jan. 22, 2015, 20 pages.
English language abstract and machine-assisted English translation for CN 101357828 extracted from espacenet.com database dated Nov. 9, 2016, 15 pages.
Machine-assisted English translation for DE 651 167 extracted from the espacenet.com database dated Jun. 4, 2012, 9 pages.
Machine-assisted English translation for DE 200 00 015 extracted from the espacenet.com database dated Jun. 4, 2012, 24 pages.
Machine-assisted English language abstract and machine-assisted English translation for DE 102 31 858 extracted from the espacenet.com database dated Mar. 18, 2014, 12 pages.
English language abstract for EP 0 445 578 extracted from the espacenet.com database dated Jun. 4, 2012, 1 page.
English language abstract for EP 0 911 304 extracted from the espacenet.com database dated Aug. 23, 2012, 1 pages.
English language abstract and machine-assisted translation for EP 1 176 257 extracted from the espacenet.com database dated Jun. 4, 2012, 14 pages.
English language abstract and machine-assisted translation for EP 1 462 571 extracted from the espacenet.com database dated Jun. 4, 2012, 9 pages.
Machine-Assisted English translation for FR 2 188 596 extracted from the espacenet.com database dated Aug. 23, 2012, 11 pages.
English language abstract and machine-assisted translation for FR 2 653 360 extracted from the espacenet.com database dated Jun. 4, 2012, 17 pages.
English language abstract and machine-assisted translation for FR 2 791 692 extracted from the espacenet.com database dated Jun. 4, 2012, 9 pages.
English language abstract and machine-assisted translation for JPS 63-319223 extracted from the espacenet.com database dated Aug. 24, 2016, 6 pages.
English language abstract and machine-assisted English translation for JPH 04-001309 extracted from the PAJ database dated Apr. 21, 2016, 6 pages.
English language abstract and machine-assisted English translation for JPH 10-102444 extracted from espacenet.com database dated Apr. 21, 2016, 17 pages.
English language abstract and machine-assisted English translation for JPH 11-80304 extracted from espacenet.com database dated Apr. 21, 2016, 13 pages.
English language abstract and machine-assisted English translation for JP 2002-021011 extracted from the PAJ database dated Apr. 21, 2016, 17 pages.
English language abstract and machine-assisted English translation for JP 2003-267953 extracted from the PAJ database dated Jan. 19, 2015, 27 pages.
English language abstract and machine-assisted translation for JP 2004-076527 extracted from the PAJ database dated Jun. 4, 2012, 30 pages.
English language abstract and machine-assisted English translation for JP 2007-132020 extracted from the PAJ database dated Jan. 19, 2015, 21 pages.
English language abstract and machine-assisted English translation for JP 2007-285045 extracted from the PAJ database dated Jan. 19, 2015, 13 pages.
English language abstract and machine-assisted English translation for JP 2007-289869 extracted from the PAJ database dated Aug. 24, 2016, 13 pages.
English language abstract for JP 2008-502773 extracted from the PAJ database dated Jan. 19, 2015, 1 page.
English language abstract and machine-assisted English translation for JP 2009-293326 extracted from espacenet.com database dated Aug. 27, 2015, 44 pages.
English language abstract for KR 96-0011358 extracted from espacenet.com database dated Aug. 24, 2016 and machine-assisted English translation for KR 96-0011358 extracted from KIPO.com database dated Aug. 24, 2016, 7 pages.
English language abstract and machine-assisted English translation for KR 10-2007-0020328 extracted from espacenet.com database dated Jan. 2, 2017, 33 pages.
English language abstract not found for KR 10-11395451; however, see English language equivalent U.S. Pat. No. 8,710,135. Original document extracted from espacenet.com database dated Dec. 3, 2016, 13 pages.
English language abstract not found for KR 10-1669716; however, see English language equivalent U.S. Pat. No. 9,505,931. Original document extracted from espacenet.com database dated Dec. 1, 2016, 13 pages.
English language abstract and machine-assisted translation for WO 95/00569 extracted from the espacenet.com database dated Jun. 4, 2012, 37 pages.
English language abstract and machine-assisted translation for WO 98/29356 extracted from the espacenet.com database dated Jun. 4, 2012, 28 pages.
English language abstract for WO 02/076900 extracted from the espacenet.com database dated Aug. 23, 2012, 16 pages.
English language abstract and machine-assisted English translation for WO 2004/014815 extracted from espacenet.com database dated Apr. 21, 2016, 20 pages.
U.S. Appl. No. 61/288,637, filed Dec. 21, 2009.
U.S. Appl. No. 15/255,688, filed Sep. 2, 2016.

* cited by examiner

COMPOSITE PAVEMENT STRUCTURE

CROSS-REFERENCE TO RELATED APPLICATIONS

This application is a continuation of U.S. patent application Ser. No. 13/517,935, filed on Aug. 28, 2012, which is the National Stage of International Patent Application No. PCT/US2010/058582, filed on Dec. 1, 2010, which claims priority to and all the advantages of U.S. Provisional Patent Application No. 61/288,637, filed on Dec. 21, 2009, the contents of which are incorporated herein by reference.

TECHNICAL FIELD

This disclosure relates to composite pavement structures, and systems and methods for making composite pavement structures comprising silylated glass aggregate and polymeric binder compositions.

BACKGROUND

Waste or recycled glass is commonly provided for secondary uses through widespread recycling programs. One such secondary use of this type of glass is as a constituent component in pavement structures, for example parking surfaces. However, the amount of recycled glass typically must be limited in many pavement structures in order to satisfy minimum performance criteria such as crush strength and flexural strength. If a pavement structure fails to meet such criteria, the pavement structure can fail and show signs of cracking and spalling. Improvements in pavement structures that can maximize the incorporation of recycled glass while meeting acceptable performance criteria are desired.

SUMMARY

One aspect of this disclosure relates to a process for making a composite pavement structure wherein glass aggregate particles ranging from about 0.1 to about 0.5 inch in diameter are provided. The glass aggregate particles are exposed to a coupling agent, for example an aqueous aminosilane solution, in an amount of about 1 to about 10 parts by weight of solution based on 100 parts by weight of the glass aggregate particles wherein the aqueous aminosilane solution contains about 0.01 to about 5.0 parts by weight aminosilane based on 100 parts by weight of solution. After exposure, the aminosilane is allowed to react and bond with the glass aggregate particles for a predetermined time period to provide primed or silylated glass particles. The primed or silylated glass particles are then dried and subsequently made available for mixing with a polymeric binder composition. Once the silylated glass and polymeric binder composition are mixed, they are allowed react and bond to provide a composite pavement structure.

In accordance with the above described process, a pavement structure produced by applying about 0.002 to about 10 pounds of aminosilane dispersed in about 19 to about 190 pounds of water per 2,000 pounds of glass aggregate particles can be produced having a crush strength exceeding 1,500 psi and a flexural strength exceeding 700 psi. This is possible because the glass aggregate particles have exposed surfaces that are reacted with and bonded to aminosilane. In turn, the polymeric binder composition is reacted with and bonded to at least some of the aminosilane. This type of bonding is stronger than bonding where a polymeric binder composition is bonded directly to unsilylated glass where the crush strength is typically only about 1,000 psi and the flexural strength is less than 500 psi. Thus, a 50% increase in crush strength and flexural is realized by silylating the glass aggregate particles before mixing them with a polymeric binder composition. Additionally, the disclosed pavement structure can be made water pervious or water impervious by adjusting the quantity of polymeric binder composition along with the addition of more fine particles, such as glass sand particles produced by a glass crusher.

A system is also disclosed for providing primed glass aggregate particles, such as silylated glass aggregate particles. The system includes a conveying system constructed and arranged to support and transport glass aggregate particles at a first transport rate and an application system constructed and arranged to expose a coupling agent, for example an aqueous aminosilane solution, to the glass aggregate particles present on the conveying system. A dryer, spaced from the application system and configured to direct at least one of forced air and heat onto the glass aggregate present on the conveying system, also provided. With the disclosed system the first transport rate can be set such that the glass aggregate present on the conveying system is first exposed to the dryer after a predetermined time period following the application of aqueous aminosilane solution to the glass aggregate particles.

DETAILED DESCRIPTION

Figure 1:
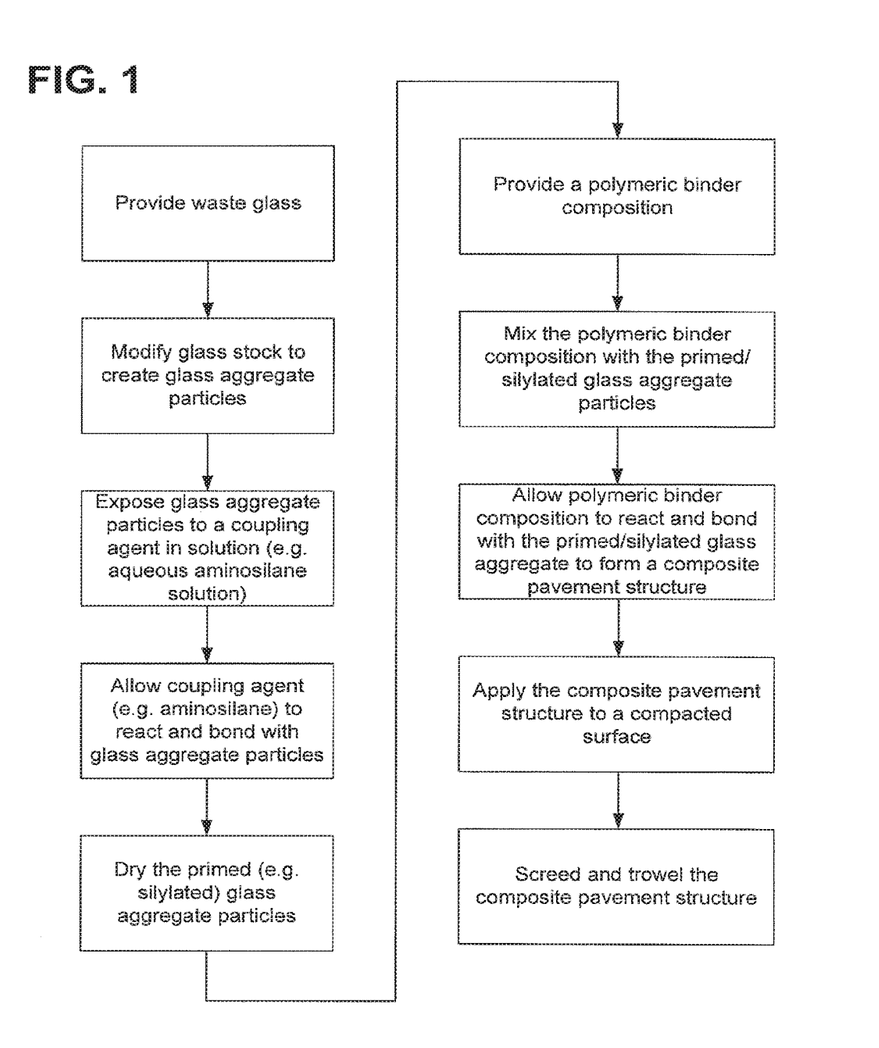
FIG. 1 shows a flow chart of a process for making a composite pavement structure comprising silylated glass aggregate particles and a polymeric binder composition.

This disclosure relates to a process for making a composite pavement structure comprising primed glass aggregate particles and a polymeric binder composition. One example of such a process is shown in FIG. 1.

In one step of the process, glass is provided and subsequently modified into glass aggregate particles. The glass may be of any type and may be clear, tinted, and/or colored. Preferably, the glass is post-consumer waste recycled glass such that overall costs and environmental costs are minimized. The waste glass can be modified in a variety of ways, such as in the manner described in U.S. Patent Application Publications 2009/0067924 and 2009/0067925 to Kaul, both of which are hereby incorporated by reference. The glass aggregate particles are formed from glass that has been crushed, tumbled and heated to round its edges and remove non-glass impurities. A suitable recycled glass is described in U.S. Pat. No. 7,041,221 to Arnott, which is hereby incorporated by reference. Waste glass is prepared by crushing the glass to desired dimensions, e.g., 1/16 inch to about 1 inch, preferably about 1/4 inch to about 1/2 inch, more preferably about 3/8 inch. It is believed that reducing the average diameter of the glass reduces spalling of the aggregate from the composite pavement structure, once installed. The glass may be crushed using an impact crusher, hammer mill, cone crusher or a roller crusher. Preferably, the recyclable glass is crushed using roller crusher as better oil adsorption can be achieved.

Any order of pre-crushing, pre-screening, crushing, cleaning and drying may be used. In a preferred embodiment however, the crushed glass is first pre-crushed and pre-screened. If the glass is clean, no pre-crushing or pre-screening is required. The pre-crushed glass is pre screened through a mesh, which may include an inch mesh, a combination of double or triple deck screens or at least two meshes. Once pre-screened through the mesh, preferably the glass is further crushed using a roller crusher and subsequently, the crushed glass is dried, after cleaning, preferably at a temperature of at least 100° F. or, more preferably, at a temperature of at least 350° F. Subsequently, the crushed glass is screened, preferably through at least a 40 mesh screen, or more preferably through a 30 mesh screen, or most preferably through a 20 mesh screen. It is noted that the above described crushing process can result in about 50 percent by weight glass aggregate particles and about 50 percent by weight glass sand particles. Suitable grades of glass are commercially available from Glass Plus Inc. of Tomahawk, Wis.

Once the waste or recycled glass has been modified to form glass aggregate particles, the particles are then exposed to a coupling agent wherein the coupling agent reacts with and bonds to the glass to form primed glass aggregate particles. As used in this application, the phrase "primed glass aggregate particles" is meant to describe glass aggregate particles whose exterior surfaces have been at least partially coated by a substance that has chemically reacted with and bonded to the exterior surfaces. As used in this application, the phrase "coupling agent" is meant to include any substance that chemically reacts and bonds with glass and a polymeric binder composition to form a stronger bond between the glass and polymeric binder composition, as compared to a direct bond between glass and the polymeric binder composition. Exemplary coupling agents include silanes with functional groups of hydroxyl, thiol, epoxy, and/or primary and secondary amines. A particularly useful example of a coupling agent is aminosilane which will cause glass aggregate particles to become primed, or more specifically, silylated or silanized. It is noted that any silane or silanol functional group will operate to prime or silylate the glass aggregate particles. However, aminosilane is preferred because aminosilane is readily soluble in water meaning that an organic solvent is not required. As such, the use of amino silane in an aqueous solution lowers the overall expense of the described process. Aminosilane concentrate is available commercially from Momentive Performance Materials of Albany, N.Y., examples of which are sold as SILQUEST® A-1100 and SILQUEST® A-1120. In order to maximize silylation of the glass aggregate particles, the aminosilane is further diluted with water to form an aqueous aminosilane solution. Preferably, the solution contains about 0.01 to about 5.0 parts by weight aminosilane, and more preferably contains about 0.3 parts by weight aminosilane, each based on 100 parts by weight solution. It has been discovered that using about 0.3 by weight SILQUEST® A-1120 results in optimally silylated glass aggregate particles that have a higher bonding strength with a polymeric binder composition. It is believed that this greater strength arises from a mono-layer being formed between the reacted aminosilane and the glass aggregate particles, rather than the formation of multiple layers. As such, a higher performing composite pavement structure will result with optimally silylated glass aggregate particles. Where the concentration of aminosilane is too low, less of the exposed surfaces of the glass aggregate particles will become primed or silylated and the composite pavement structure will not be as strong as a larger fraction of the exposed surfaces of the glass aggregate particles will become directly bonded to the polymeric binder composition. Conversely, where the concentration of aminosilane is excessive, it is more likely that more of the exposed surfaces of the primed or silylated glass aggregate particles will form multiple layers and also become bonded to each other rather than to the polymeric binder composition, and thus form a reduced strength composite pavement structure.

Where aqueous aminosilane solution is used as the coupling agent to prime the glass aggregate particles, the solution may be applied at a ratio of about 1 to about 10 parts by weight solution based on 100 parts by weight of glass aggregate particles. Most preferably, the aqueous aminosilane solution is applied in a ratio of about 5 parts by weight aqueous aminosilane solution to 100 parts by weight glass aggregate. At this ratio, optimal silylation of the glass aggregate particles can occur while waste of the solution is minimized.

There are many ways in which the glass aggregate particles may be exposed to the coupling agent. For example, a batch process may be used wherein the aggregate and the coupling agent, in an aqueous solution, are tumbled together for a predetermined period of time, such as for five minutes. Alternatively, and as described in more detail later with respect to FIG. 2, a continuous process may be used in which the coupling agent is sprayed and/or dispersed onto the glass aggregate particles on a conveying system. Yet another example, described in more detail later with respect to FIG. 3, a continuous process may be used in which the glass aggregate particles are transported through a volume of an aqueous solution containing the coupling agent wherein the volume is held in a channel, container or vessel. One skilled in the art will appreciate that other methods for exposing the glass aggregate particles to the coupling agent, and more specifically to an aqueous amino silane solution, may be used without departing from the concepts presented herein.

Once the aqueous aminosilane solution comes into contact with the glass aggregate particles, the aminosilane will begin to react and bond with the glass aggregate particles. In order to optimize the silylation of the glass, the aminosilane solution should remain in contact with the glass aggregate particles for a predetermined time period. Preferably, the predetermined time period is about 15 seconds to two minutes such that a sufficient reaction has occurred before proceeding with drying the now silylated glass aggregate particles.

Once the glass aggregate particles are sufficiently silylated, the silylated glass aggregate particles may be dried. Drying may be performed in a variety of ways. For example, the silylated glass aggregate particles can be separated from the solution, for example by draining, and allowed to air dry in ambient conditions. Where accelerated drying is desired, a blower can be used to direct forced air over the silylated glass aggregate particles. Where even further accelerated drying is desired, a heater may be used to direct forced air and/or heat over the silylated glass aggregate particles. When dried without heat, the silylation process will continue to occur for a time period up to about 24 hours. As such, it is preferred to store the silylated glass particles for a sufficient period of time to allow full silylation to occur before using the glass aggregate particles in a composite pavement structure. When heat is used, generally about 120° F. to 200° F., the reaction time is significantly shortened to allow for immediate use of the silylated glass aggregate particles in a composite pavement structure. During and after this time period, the silylated glass aggregate particles may be stored or transported to an end use location, such as a construction site. The particles may be stored in a variety of discrete containers, such as superstacks and drums. Alternatively, the particles may be held in larger bulk quantities, as is the case with railcars and tankers.

Once the silylated glass aggregate particles have been transported to an end use site, the aggregate may be mixed with a polymeric resin binder to form a composite pavement structure. A full discussion of polymeric resin binders, and their use in mixing with aggregates to form a composite pavement structure, is provided in Patent Cooperation Treaty Application PCT/PCT/EP2010/058989, filed on Jun. 24, 2010, the entirety of which is incorporated by reference herein. A further discussion of such binders and their use is provided in U.S. Patent Application Publications 2009/0067924 and 2009/0067295 to Kaul. Other suitable binder compositions, for purposes of the present invention, are disclosed as "elastomeric compositions" in U.S. Provisional patent Application Ser. No. 61/288,637, the disclosure of which is incorporated by reference herein.

One example of a polymeric binder composition is the reaction product of a two-part composition comprising a first component and a second component. As such, it is to be appreciated that the term two-component refers to these components. Other additional components may be used. The binder composition may be referred to in the art as a 2K system. The first and second components are mixed to form the reaction product of the binder composition. The term reaction product as used herein is intended to encompass all stages of interaction and/or reaction between the first and second components, including reaction products of the first and second components, even when the reaction product contacts the aggregate to form the composite material. Generally, the reaction product begins to form when the first and second components come into contact with each other. In one embodiment, the reaction product is a polyurethane wherein the first component is an isocyanate component and the second component is an isocyanate-reactive component.

Once the polymeric binder composition is mixed with the silylated glass aggregate particles, the polymeric binder composition will react and bond with the silylated glass to form a composite pavement structure. While the composition is still workable, the composite pavement structure may be applied to a compacted surface and subsequently screeded and troweled. Once the polymeric binder composition has fully cured, the composite pavement structure will be ready for use.

Two examples of a composite pavement structure were prepared and tested wherein each example was comprised of an isocyanate based polymeric binder composition and an aggregate, 100% of which was glass aggregate having an average size of about ¼ inch in combination. In the first example, unprimed/unsilylated glass aggregate particles were used while in the second example, primed/silylated glass aggregate particles were used. Table 1 below shows the constituents and properties of the polymeric binder composition used in both the first and second examples.

TABLE 1

| Polymeric Binder Composition Components and Properties | |
|---|---|
| Resin Component (components by weight %) | |
| Hydrophobic Polyol (castor oil, commercially available from Eagle Specialty Products, Inc. | 92.45 |

TABLE 1-continued

| Polymeric Binder Composition Components and Properties | |
|---|---|
| Chain Extender (DPG) | 7.00 |
| Molecular Sieve (3A) | 0.50 |
| Antifoaming Agent (Antifoam A, commercially available from Dow Corning) | 0.05 |
| Isocyanate Component (components by weight %) | |
| Isocyanate-prepolymer (liquid, modified short chain prepolymer based on pure 4,4'-MDI and having an NCO content of 22.9 wt. %, commercially available from BASF Corporation.) | 60.00 |
| Polymeric isocyanate (PMDI with a functionality of about 2.7 and an NCO content of 31.5 wt. %, commercially available from BASF Corporation.) | 40.00 |
| Polymeric Binder Composition Properties: | |
| Resin/Isocyanate Weight Ratio | 1.404 |
| Isocyanate Index | 121 |
| Tensile Strength, psi | 2,685 |
| Elongation, % | 100 |
| Grave's Tear Strength, ppi | 426 |
| Durometer Shore Hardness | D 56 |
| Peel Strength | ppi 75 |
| Tg, ° C. | 44 |

To prepare the primed glass aggregate particles for the second example, the glass was silylated by tumbling the glass particles with an aqueous solution comprising 0.3 wt. % SILQUEST® A-1120, commercially available from Momentive Performance Products. To prime or silylate the glass, 5 parts of the aqueous solution was tumbled with 100 parts of the glass for about 5 minutes. The aqueous solution was then drained off and the glass was allowed to dry. To form the composite pavement material of the two examples, 4.2 wt. % of the polymeric binder composition was mixed with 95.8 wt. % aggregate. The first and second examples of the composite pavement material were allowed to fully cure and were sub subsequently tested. The test results are presented in Table 2 below.

TABLE 2

| Property | First Example (raw, untreated glass used) | Second Example (silylated glass used) |
|---|---|---|
| Crush Strength, psi | 1,050 | 1,550 |
| Flexural Strength, psi | 468 | 711 |
| Flexural Modulus, psi | 104,984 | 84,633 |
| Porosity, % | 37.6 | 37.6 |
| Permeability, in/hour | 1,650 | 1,650 |

As can be readily appreciated by viewing the above data, the use of primed or silylated glass instead of raw glass in a composite pavement structure significantly enhances crush strength and flexural strength without compromising porosity and permeability in a pervious pavement application. For example, the test data shows that the crush strength of the composite pavement material increased by about 50% when silylated glass aggregate particles were used instead of untreated glass aggregate particles. In field prepared applications of the composite pavement structure, each of the above values are readily obtainable while a minimum crush strength of at least about 1,300 psi can be repeatedly achieved, even with some variances in the constituent components of the composite. At least two implications arising from the use of the disclosed porous composite pavement structure using primed glass are: 1) the thickness of the composite pavement structure may be reduced; and 2) the composite pavement structure can be used in applications not currently suitable for prior art glass aggregate based pavement structures.

Figure 2:
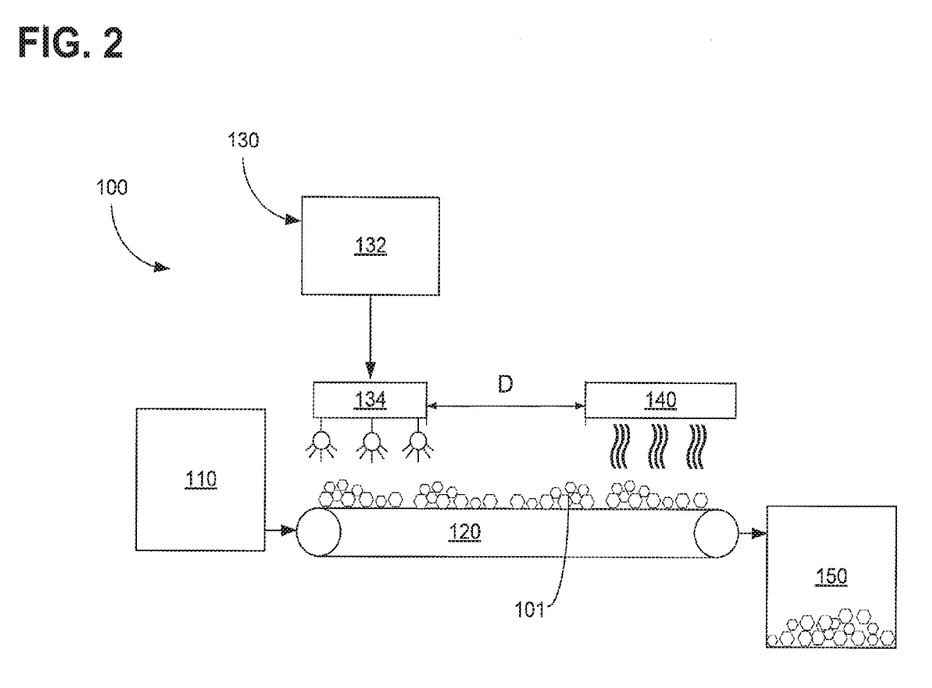
FIG. 2 is a schematic showing a first system for providing primed glass aggregate particles in the process shown in FIG. 1.
Figure 3:
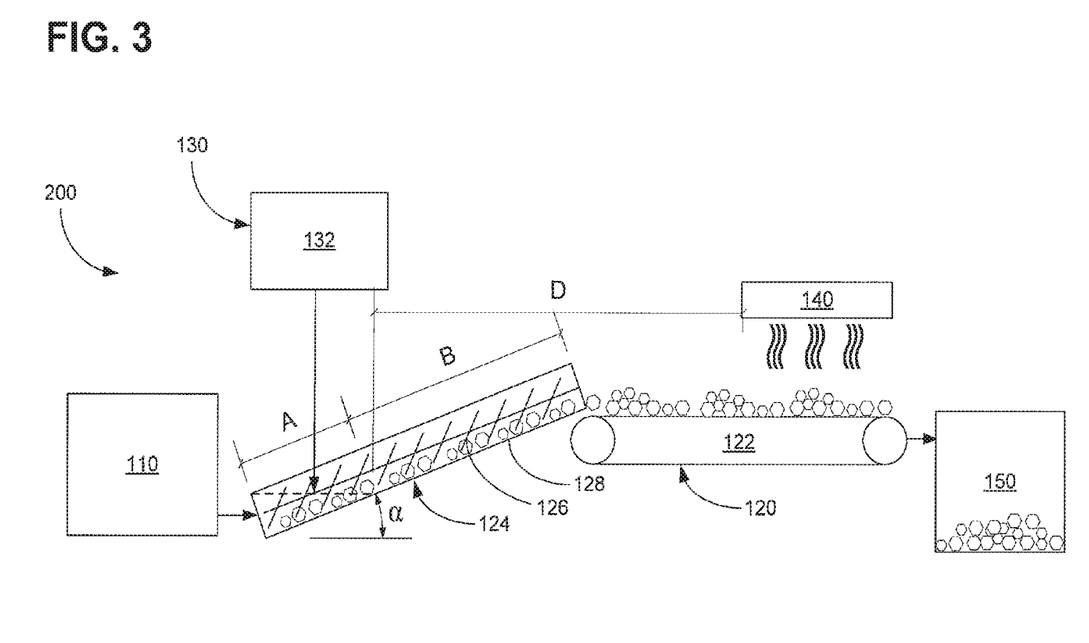
FIG. 3 is a schematic showing a second system for providing for providing primed glass aggregate particles in the process shown in FIG. 1.

With reference to FIG. 2, a system 100 for producing the disclosed primed or silylated glass aggregate particles is shown. One aspect of the system is glass aggregate source 110. Glass aggregate source 110 is for providing glass aggregate 101 to a conveying system 120. In one embodiment, glass aggregate source 10 can include a roller crusher and a heater to remove non-glass impurities, as described above.

Another aspect of system 100 is conveying system 120. Conveying system 120 is for supporting and transporting the glass aggregate particles 101 from the glass aggregate source 110 to the aggregate collection station 150. Conveying system 120 is also for supporting the glass aggregate particles 101 while they become primed or silylated and subsequently dried. Many types of conveying systems are suitable for this purpose. In the exemplary embodiment shown in FIG. 2, conveying system 120 includes a belt type conveyer 122 having a belt that is water pervious for allowing the aqueous solution to pass through the belt. In this example, the conveying system is configured to transport the glass aggregate particles at a transport rate from about 1 ton to 20 tons of glass aggregate per hour, and most preferably at 14 tons per hour. One skilled in the art will appreciate that many other types of conveying systems are suitable for the above stated purposes.

Yet another aspect of system 100 is application system 130. Application system 130 is for exposing the glass aggregate particles present on the conveying system 120 to the coupling agent in solution, for example an aqueous aminosilane solution. Many types of systems are suitable for this purpose. In the example shown in FIG. 2, application system 130 is comprised of an aqueous aminosilane solution tank 132 and a sprayer 134 in fluid communication with the tank 132. In operation, solution is pumped to sprayer 134 from tank 132 and is then sprayed onto the glass aggregate particles. Preferably, and as stated above, about 5 parts per weight of solution are applied for each 100 parts by weight glass aggregate particles. The solution, after contacting the glass aggregate particles drains through the conveying system 120 where it can be disposed of or recycled back into tank 132. Once the solution contacts the glass aggregate particles, the particles become silylated.

Another aspect of system 100 is dryer 140. Dryer 140 is for drying water away from the primed or silylated glass aggregate and, where heat is used, accelerating the reaction process between the glass aggregate particles and the coupling agent. Many types of dryers are suitable for this purpose. In the exemplary embodiment shown in FIG. 1, the dryer 140 is a forced air heater which directs heated air onto the glass aggregate particles. One skilled in the art will appreciate that burners, radiant heaters and blowers without heaters may be used as well. In order to allow for the glass aggregate particles to become sufficiently silylated before drying, dryer 140 is shown as being spaced apart from the sprayer at a distance D. In combination with the transport rate or specific belt speed of the conveying system 120, the distance D is set such that the glass aggregate particles are allowed to react with the coupling agent, for example aminosilane, for a predetermined time period, preferably about 15 seconds to two minutes, before the particles are dried.

With reference to FIG. 2, another exemplary system for providing primed or silylated glass aggregate particles is shown. Several features of the system shown in FIG. 2 are similar to those shown in FIG. 1 and are shown with similar numbers, where appropriate. The aforementioned description with respect to the system shown in FIG. 1 is incorporated into the description of the system shown in FIG. 2. In FIG. 2, a system 200 is shown. Glass aggregate source 110 and glass aggregate collection station 150 are configured similarly to that shown in FIG. 1, as is dryer 140. However, in this particular embodiment, dryer 140 is a forced air system without having a heating element. The more significant differences between systems 100 and 200 will now be discussed.

One aspect of system 200 is that conveying system 120 includes two conveyors instead of the single conveyor shown in FIG. 1. In the exemplary embodiment shown in FIG. 2, a conveyor 124 is provided that is constructed and configured to deliver aggregate 101 from aggregate source 110 to conveyor 120. Conveyor 124 is also for exposing the glass aggregate particles to the coupling agent in solution, for example an aqueous aminosilane solution. However, instead of the sprayer of FIG. 1, the application system 130 in FIG. 2 is embodied in conveyor 124 itself. As shown, conveyor 124 is a screw type conveyor with an auger 126 disposed in a channel 128. Both the channel 128 and the auger 126 are disposed at a predetermined angle, α such that Channel 128 is oriented to retain a volume of solution containing the coupling agent, for example aqueous aminosilane solution, along a dimension A. In the example embodiment shown, angle α is about 20 degrees from horizontal. One skilled in the art will appreciate that changing the angle α will correspondingly change the length of dimension A. In the configuration shown, the glass aggregate particles 101 being transported by the auger 126 from source 100 are either partially or wholly submerged in the solution while the particles are within dimension A. As the particles pass up along the channel 128 and into dimension B, the solution is no longer present and the particles begin to drip dry whereby the excess solution drains back down towards the bottom area of the channel 128, dimension A. This configuration allows for very little waste of the solution while providing for a high degree of coverage of the solution over the particles. As with system 100, the dryer 140 of system 200 is spaced apart from the area where the particles are exposed to the aminosilane at a distance D in order to allow sufficient time for the particles to adequately begin the priming or silylation process.

Figure 4:
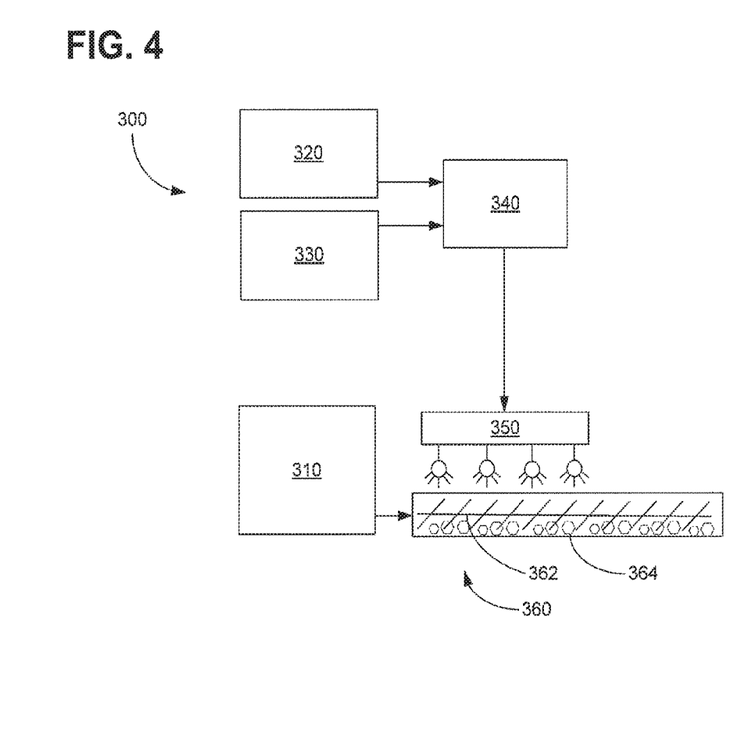
FIG. 4 is a schematic showing a system for mixing the primed glass aggregate particles and polymeric binder composition in the process shown in FIG. 1.

With reference to FIG. 4, a system 300 is shown for making a composite pavement structure using the primed or silylated glass aggregate particles from either system 100 or 200. System 300 is fully disclosed in PCT/PCT/EP2010/058989, a brief description of which follows here. As shown, system 300 includes a glass aggregate particle source, here a primed or silylated glass aggregate particle source 310. System 300 also includes a container 320 for holding a first component of a polymeric binder composition and a container 330 for holding a second component of the composition. The first and second components are mixed together at mixing station 340 where a reaction product is at least partially created. In the particular embodiment shown, the reaction product is provided to mixing system 360 via an applicator 350, which may be a sprayer, while the silylated glass aggregate particles are transported along mixing system 360 via an auger 362 disposed within a channel 364. Once both the reaction product and the silylated glass aggregate particles are mixed and transported within mixing system 360, a composite pavement structure is formed and can then be delivered to an installation area. Where aminosilane is used as the coupling agent, the resulting composite pavement structure will comprise about 0.002 to about 10.0 pounds of aminosilane per about 2,000 pounds of glass aggregate particles, and preferably about 0.3 pounds of aminosilane per about 2,000 pounds of glass aggregate particles.

The above are example principles. Many embodiments can be made.

What is claimed is:

1. A composite pavement structure comprising:
   glass aggregate particles having all rounded edges having exposed surfaces and having a size ranging from about 1/16 to about 1/2 inch in diameter, at least some of the exposed surfaces of the glass aggregate particles being reacted with and bonded to a coupling agent; and
   a polymeric binder composition being reacted with and bonded to at least some of the coupling agent that has reacted with and bonded to the glass aggregate particles;
   wherein the composite pavement structure has a crush strength of at least about 1,300 pounds per square inch.

2. The composite pavement structure according to claim 1, wherein the coupling agent is aminosilane.

3. The composite pavement structure according claim 2, wherein the composite comprises:
   i) about 0.002 to about 10 pounds of aminosilane per about 2,000 pounds of glass aggregate particles.

4. The composite pavement structure according to claim 1, wherein the polymeric binder composition includes the reaction product of a two component polymeric binder composition comprising:
   i) a first component and a second component reactive with the first component; or
   ii) a polymeric isocyanate and an isocyanate-reactive component.

5. The composite pavement structure according to claim 1, wherein the composite is water permeable.

6. A process for making a composite pavement structure according to claim 1, the process including the steps of:
   providing glass aggregate particles having all rounded edges ranging from about 1/16 to about 1/2 inch in diameter:
   providing a polymeric binder composition;
   exposing the glass aggregate particles to a coupling agent that increases the bond strength between the glass aggregate particles and the polymeric binder composition;
   allowing the coupling agent to react and bond with the glass aggregate particles for a predetermined time period to provide primed glass aggregate particles;
   drying the primed glass aggregate particles;
   mixing the dried primed glass aggregate particles with the polymeric binder composition; and
   allowing the polymeric binder composition to react and bond with the dried primed glass aggregate particles to provide the composite pavement structure.

7. The process according to claim 6, wherein:
   the step of exposing the glass aggregate particles to a coupling agent includes exposing the glass aggregate particles to an aqueous aminosilane solution in an amount of about 1 to about 10 parts by weight of solution based on 100 parts by weight of the glass aggregate particles, the aqueous aminosilane solution containing about 0.01 to about 5.0 parts by weight aminosilane based on 100 parts by weight of solution; and
   the step of allowing the coupling agent to react and bond with the glass aggregate particles to provide primed glass particles includes allowing the aminosilane to react and bond with the glass aggregate particles to provide silylated glass aggregate particles.

8. The process according to claim 7, wherein the step of exposing the glass aggregate particles to an aqueous aminosilane solution includes:
   i) exposing the glass aggregate particles to an aqueous aminosilane solution in an amount of about 5 parts by weight of solution based on 100 parts by weight of the glass aggregate particles; and/or
   ii) exposing the glass aggregate particles to an aqueous aminosilane solution containing about 0.3 parts by weight aminosilane based on 100 parts by weight of solution.

9. The process according to claim 7, wherein the step of allowing the aminosilane to react and bond with the glass aggregate particles for a predetermined time period includes allowing the aminosilane to react and bond with the glass aggregate particles for at least about 15 seconds before the step of drying the silylated glass aggregate particles.

10. The process according to claim 6, wherein the step of providing a polymeric binder composition includes:
    i) providing the reaction product of a two component polymeric binder composition comprising a first component and a second component reactive with the first component; or
    ii) providing a first component comprising a polymeric isocyanate and providing a second component comprising an isocyanate-reactive component.

11. The process according to claim 6, wherein the step of providing glass aggregate particles includes providing recycled glass.

* * * * *